(12) United States Patent
Park et al.

(10) Patent No.: US 11,063,294 B2
(45) Date of Patent: Jul. 13, 2021

(54) CURING DIE FOR MANUFACTURING GEL POLYMER ELECTROLYTE, AND METHOD FOR MANUFACTURING GEL POLYMER BATTERY CELL BY USING SAME

(71) Applicant: LG Chem, Ltd., Seoul (KR)

(72) Inventors: Se Mi Park, Daejeon (KR); Yong Jun Kim, Daejeon (KR); Chae Ah Kim, Daejeon (KR); Seok Koo Kim, Daejeon (KR); Seung Hyun Chung, Daejeon (KR)

(73) Assignee: LG Chem, Ltd.

( * ) Notice: Subject to any disclaimer, the term of this patent is extended or adjusted under 35 U.S.C. 154(b) by 165 days.

(21) Appl. No.: 15/754,174

(22) PCT Filed: Nov. 9, 2016

(86) PCT No.: PCT/KR2016/012838
§ 371 (c)(1),
(2) Date: Feb. 21, 2018

(87) PCT Pub. No.: WO2017/082618
PCT Pub. Date: May 18, 2017

(65) Prior Publication Data
US 2018/0254522 A1    Sep. 6, 2018

(30) Foreign Application Priority Data

Nov. 12, 2015    (KR) .................. 10-2015-0158554

(51) Int. Cl.
*H01M 10/0565* (2010.01)
*H01M 10/04* (2006.01)
(Continued)

(52) U.S. Cl.
CPC ......... *H01M 10/0565* (2013.01); *B29C 35/00* (2013.01); *B29C 35/02* (2013.01);
(Continued)

(58) Field of Classification Search
CPC ..................... H01M 10/0404–0409
See application file for complete search history.

(56) References Cited

U.S. PATENT DOCUMENTS 6,119,762 A * 9/2000 Miyagi .................. B22D 19/00
164/326
6,146,578 A * 11/2000 Van Ert ............... B60R 13/0225
264/510
(Continued)

FOREIGN PATENT DOCUMENTS

CN    1383390 A    12/2002
CN    1560953 A    1/2005
(Continued)

OTHER PUBLICATIONS

Extended European Search Report for Application No. EP16864544 dated Apr. 5, 2018.
(Continued)

*Primary Examiner* — Robert S Carrico
(74) *Attorney, Agent, or Firm* — Lerner, David, Littenberg, Krumholz & Mentlik, LLP

(57) ABSTRACT

The present invention provides a curing die for manufacturing a gel polymer electrolyte, and a method for manufacturing a gel polymer battery cell by using the same, the curing die comprising: a first die having a recessed part, which is formed inside a battery case and has a processing battery cell mounted therein and including an electrode assembly and a composition for forming the gel polymer electrolyte; and a second die coupled to the first die so as to seal the processing battery cell mounted in the recessed part.

17 Claims, 12 Drawing Sheets

(51) Int. Cl.
*H01M 10/0525* (2010.01)
*H01M 10/0585* (2010.01)
*B29C 35/00* (2006.01)
*B29C 35/02* (2006.01)
*H01M 4/1315* (2010.01)

(52) U.S. Cl.
CPC ..... *H01M 4/1315* (2013.01); *H01M 10/0404* (2013.01); *H01M 10/0525* (2013.01); *H01M 10/0585* (2013.01); *H01M 2300/0082* (2013.01); *H01M 2300/0085* (2013.01)

(56) References Cited

U.S. PATENT DOCUMENTS

| | | | | |
|---|---|---|---|---|
| 6,558,438 | B1* | 5/2003 | Satoh | H01M 10/0413 29/623.1 |
| 2002/0023339 | A1 | 2/2002 | Mizutani et al. | |
| 2003/0141841 | A1 | 7/2003 | Kawabata et al. | |
| 2004/0146785 | A1 | 7/2004 | Mizutani et al. | |
| 2004/0213985 | A1 | 10/2004 | Lee et al. | |
| 2006/0078799 | A1 | 4/2006 | Watanabe et al. | |
| 2010/0209764 | A1* | 8/2010 | Heo | B29C 33/40 429/163 |
| 2011/0293977 | A1* | 12/2011 | Kim | H01M 2/166 429/94 |
| 2016/0158970 | A1* | 6/2016 | Xie | B29C 35/02 249/78 |

FOREIGN PATENT DOCUMENTS

| | | |
|---|---|---|
| CN | 101276934 A | 10/2008 |
| CN | 101807713 A | 8/2010 |
| CN | 102334216 A | 1/2012 |
| CN | 102368564 A | 3/2012 |
| JP | H11086834 A | 3/1999 |
| JP | 2000294290 A | 10/2000 |
| JP | 2001110451 A | 4/2001 |
| JP | 2006100064 A | 4/2006 |
| JP | 2015123459 A | 7/2015 |
| KR | 20010100242 A | 11/2001 |
| KR | 20030044611 A | 6/2003 |
| KR | 20030066380 A | 8/2003 |
| KR | 20060042326 A | 5/2006 |
| KR | 20080087340 A | 10/2008 |
| KR | 100943569 B1 | 2/2010 |
| KR | 20100094174 A | 8/2010 |
| KR | 101016870 B1 | 2/2011 |

OTHER PUBLICATIONS

International Search Report From PCT/KR2016/012838 dated Feb. 10, 2017.
Chinese Search Report for Application No. 201680051013.9 dated Jul. 3, 2020, 3 pages.

* cited by examiner

CURING DIE FOR MANUFACTURING GEL POLYMER ELECTROLYTE, AND METHOD FOR MANUFACTURING GEL POLYMER BATTERY CELL BY USING SAME

CROSS-REFERENCE TO RELATED APPLICATIONS

This application is a national phase entry under 35 U.S.C. § 371 of International Application No. PCT/KR2016/012838, filed Nov. 9, 2016, which claims priority to Korean Patent Application No. 10-2015-0158554, filed Nov. 12, 2015, the disclosures of which are incorporated herein by reference.

TECHNICAL FIELD

The present invention relates to a curing die for manufacturing a gel polymer electrolyte and a method for manufacturing a gel polymer battery cell by using the same.

BACKGROUND ART

Recently, an interest in energy storage technology is increasing. As application fields are expanded to mobile phones, camcorders, notebook PCs and even electric vehicles, effort to research and develop a battery is becoming more and more specific. An electrochemical device has attracted the greatest attention in this respect. In particular, according to the recent trend of miniaturization and light weight of electronic devices, development of a secondary battery as a small sized, light weight, and chargeable and rechargeable battery with high capacity has become the focus of attention.

Examples of the secondary battery may include a lead storage battery, a nickel-cadmium battery (NiCd), a nickel-hydrogen storage battery (NiMH), a lithium-ion battery (Li-ion), and a lithium-ion polymer battery (Li-ion polymer).

The secondary battery is manufactured by mounting an electrode assembly composed of an anode, a cathode, and a separator inside a metal can having a cylindrical shape, a prismatic shape, or the like, or inside a pouch-type case of an aluminum laminate sheet, and injecting an electrolyte into the electrode assembly.

As the electrolyte for a secondary battery, a liquid electrolyte in which a salt is dissolved in a non-aqueous organic solvent is mainly used. However, such a liquid electrolyte has a disadvantage in that safety is poor due to possibility of volatilization of an organic solvent and possibility of combustion caused by an increase in an ambient temperature and a temperature of the battery itself. In particular, the lithium secondary battery has a problem in that when a charge and discharge process proceeds, decomposition of a carbonate organic solvent and/or a side reaction between the organic solvent and the electrode generates gas inside the battery, and thus a battery thickness is expanded, and this reaction is accelerated during storage at high temperature, thereby further increasing an amount of gas generated.

Such continuously generated gas causes an increase in internal pressure of the battery, thereby causing a phenomenon in which a center portion of a specific surface of the battery is deformed, for example, a prismatic battery is swollen in a specific direction, etc., and causing a local difference in close contacting property on an electrode surface in the battery, and thus a problem that an electrode reaction does not occur equally on an entire electrode surface is caused. As a result, deterioration in performance and safety of the battery is inevitably caused.

Therefore, a polymer electrolyte is used to overcome the safety problem of such a liquid electrolyte. In general, safety of a battery improves in the order of liquid electrolyte<gel polymer electrolyte<solid polymer electrolyte. However, the solid polymer electrolyte has very low ionic conductivity at room temperature, and thus commercialization of a battery composed of the solid polymer electrolyte is very limited due to weak battery performance.

On the other hand, the gel polymer electrolyte has an advantage of excellent stability since the ionic conductivity may be close to the ionic conductivity of the liquid electrolyte, and there is no possibility of fluidity or leaking. In particular, a chemically cross-linked gel polymer electrolyte forms a network structure by chemical bonding, and thus there is an advantage in that there is almost no structural change due to heating or time.

In order to introduce the chemically cross-linked gel polymer electrolyte into the secondary battery, a composition for forming a gel polymer electrolyte in which a reactive monomer or oligomer and an initiator are dissolved in a liquid electrolytic solution is injected into a battery case in which an electrode assembly is embedded. A method in which the cell after the injection is stored in a high-temperature oven to cure a monomer or an oligomer contained in the electrolytic solution by cross-linking is suggested.

However, when the battery case is stored in the oven and cured, the liquid electrolytic solution is randomly placed in extra space in the case, and thus an unnecessary volume of the battery increases due to gelation and a shape of an appearance becomes uneven. In addition, since the curing process is performed by including an unsealed part of the battery case, there is a problem in that when the electrolytic solution is cured in the unsealed part, sealing strength is weakened when resealing is performed later.

Therefore, it is urgent to develop a method for manufacturing a gel polymer battery cell capable of solving the above problems.

DISCLOSURE

Technical Problem

The present invention aims to solve the above-described problems of

The present invention aims to uniformly distribute a composition for forming a gel polymer electrolyte inside a battery case when a cross-linking reaction for forming a gel polymer electrolyte is performed, thereby uniformly maintaining a shape of an appearance of the battery. To this end, the present invention has been made in an effort to provide a curing die for manufacturing a gel polymer electrolyte and a method for manufacturing a gel polymer battery cell by using the same.

Further, the present invention has been made in an effort to provide a curing die for manufacturing a gel polymer electrolyte and a method for manufacturing a gel polymer battery cell by using the same having advantages of preventing the composition for forming a gel polymer electrolyte from leaking into an unsealed part of the battery case to solve a problem that sealing strength is weakened at the time of resealing.

the conventional art and technical problems required from the past.

Technical Solution

An exemplary embodiment of the present invention provides a curing die for manufacturing a gel polymer electrolyte, including:

a first die including a recessed part in which a processing battery cell including an electrode assembly and a composition for forming a gel polymer electrolyte inside a battery case is mounted; and a second die coupled to the first die so as to close the processing battery cell mounted in the recessed part.

Here, a shape and a size, etc., of the recessed part of the first die correspond to a shape and a size of the processing battery cell to be mounted. When the processing battery cell is mounted in the recessed part of the first die and the second die is coupled to the first die in a manner of closing the processing battery cell, the composition for forming a gel polymer electrolyte in a liquid state which is included in the processing battery cell inside the curing die may be distributed in the same manner as the shape of the recessed part to thereby maintain the shape. Accordingly, after curing through the cross-linking reaction of the composition for forming a gel polymer electrolyte, the gel polymer battery cell may have a smooth appearance without being rugged according to the shape of the closed recessed part.

Further, the processing battery cell may include an unsealing part for injecting the composition for forming a gel polymer electrolyte, and there is a problem in that the electrolyte flows into the unsealed part. However, when the processing battery cell is mounted in the curing die and cured, the unsealed part of the processing battery cell maintains a sealed state by the coupling of the first die and the second die outside the recessed part, thereby preventing the composition from flowing out to the unsealed part from an accommodating part of the battery case including the electrode assembly embedded where the composition is mainly distributed, and further solving the problem that the sealing strength is weakened at the time of resealing.

In order to achieve the above object, the curing die is required to be capable of transferring heat to the composition so that an initiator reaches a temperature sufficient to initiate a reaction for the cross-linking reaction of the composition for forming a gel polymer electrolyte in the processing battery cell mounted therein. Thus, according to an embodiment of the present invention, at least one of the first die and the second die may be partly or entirely formed of a heat conductive material.

Specifically, according to an embodiment of the present invention, the first die or the second die may be formed of the heat conductive material, a part of the first die and/or a part of the second die may be formed of the heat conductive material, and the first die and the second die may be entirely formed of the heat conductive material. That is, the material is not limited as long as it is capable of transferring heat to the processing battery cell.

However, in order to avoid problems such as short-circuit, etc., at a portion in contact with an electrode terminal of the processing battery cell, a peripheral portion of a portion where the electrode terminal of the first die is placed and a peripheral portion of a portion of the second die that abuts the electrode terminal when coupled with the first die may be formed of a heat resistant material such as plastic, etc., rather than a heat conductive material.

Therefore, considering both heat transfer efficiency and the reduction in the possibility of short-circuit, it is preferable that the first die and/or the second die is partly formed of the heat conductive material. Specifically, in the first die and the second die, the peripheral portion of the portion that abuts the electrode terminal of the processing battery cell is preferably formed of the heat resistant material such as plastic, etc., and the remainder is preferably formed of the heat conductive material.

In addition, a portion excluding the periphery of the portion that abuts the electrode terminal of the processing battery cell, a part of the die may be entirely formed of the heat conductive material randomly or with predetermined patterns. However, it is preferable that heat is effectively transferred to the composition for forming a gel polymer electrolyte in the processing battery cell, and thus it is preferable that the recessed part of the first die in which the processing battery cell is embedded is partly or entirely formed of the heat conductive material, or a portion of the second die that faces the recessed part of the first die is partly or entirely formed of the heat conductive material. Further, only the recessed part of the first die and the second die corresponding thereto may be partly or entirely formed of the heat conductive material.

In this case, the heat conductive material is not limited as long as it is a material capable of transferring heat, but specifically, may be a metal having high thermal conductivity, and more specifically, any one selected from the group consisting of aluminum (Al), copper (Cu), platinum (Pt), gold (Au), nickel (Ni), iron (Fe), zinc (Zn), and an alloy thereof, etc., but is not limited thereto.

Meanwhile, the curing die may be used only for maintaining the shape of the processing battery cell, and the curing die may be stored again in an oven to perform curing according to the cross-linking reaction of the electrolyte. However, according to the present invention, the curing die itself may have a heating function and the curing may be performed without using the oven separately, and thus the composition for forming a gel polymer electrolyte may be gelled by a simpler method.

Here, according to an embodiment of the present invention, at least one of the first die and the second die may include a heating wire connected to a temperature controller so that the curing die is able to perform its own heating.

Here, a position where the heating wire is formed is related to a portion formed of the heat conductive material in the curing die described above. Specifically, it is formed to include a position corresponding to the portion formed of the heat conductive material among the dies for heat transfer efficiency.

For example, in the curing die, when the first die is partly or entirely formed of the heat conductive material, the heating wire may be included inside the first die, and when the second die is partly or entirely formed of the heat conductive material, the heating wire may be included inside the second die. Naturally, when both the first die and the second die include the portion formed of the heat conductive material, only one of them may include the heating wire, but specifically, both of the dies may include the heating wire.

In addition, the position of the heating wire is not limited and may be various. For example, the heating wire may be uniformly distributed so as to equally transfer heat to the entire die. In order to perform the cross-linking reaction of the composition for forming a gel polymer electrolyte more efficiently at the same electric power, a number of positions of the heating wire may be distributed in the vicinity of the recessed part of the first die in which the processing battery cell is mounted or in the portion of the second die that faces the recessed part.

Similarly, when the recessed part of the first die or the portion of the second die that faces the recessed part of the first die is partly or entirely formed of the heat conductive material, the heating wire may be distributed only to the portion corresponding thereto.

The curing die of the present invention may also include die terminals that contact the electrode terminals of the processing battery cell so as to simplify the process by performing a manufacturing process of the gel polymer electrolyte through the cross-linking reaction and then performing an activation process of the gel polymer battery cell including the gel polymer electrolyte together.

Specifically, according to an embodiment of the present invention, the first die and the second die each may include the die terminals formed of the conductive material at positions in contact with electrode terminals of the processing battery cell, and the die terminals may be connected to an external charge and discharge device.

In the curing die having such a structure, as described above, the gel polymer electrolyte may be formed, and then, a charge and discharge process for the activation process may proceed continuously, and thus it is possible to simplify the subsequent process.

According to an embodiment of the present invention, the die terminals may function to perform the charge and discharge process, and thus, the die terminals formed on the first die and the die terminals formed on the second die may be formed at corresponding positions so that the first die and the second die are in contact with each other at the same polarity when the first die and the second die are coupled. Even when the processing battery cell is mounted thereafter, the processing battery cell may be mounted so that the polarity of the electrode terminals of the processing battery cell corresponds to the polarity of the die terminals. Accordingly, according to an embodiment of the present invention, the die terminals may include a (+) die terminal in contact with a cathode terminal of the processing battery cell and a (−) die terminal in contact with an anode terminal of the processing battery cell.

For the same reason, formation positions of the (+) die terminals and the (−) die terminals depend on a positional relationship with the electrode terminals of the processing battery cell to be mounted. For example, when manufacturing a unidirectional battery cell in which the electrode terminals of the battery cell protrude in the same direction, in the first die, the (+) die terminal and the (−) die terminal may be independently formed on an outer surface of one side end part of the recessed part. When manufacturing a bidirectional battery cell in which the electrode terminals of the battery cell protrude in different directions at one side end part and the other side end part of the battery cell, in the first die, the (+) die terminal and the (−) die terminal may be formed on the outer surface of one side end part of the recessed part and on an outer surface of the other side end part opposite to the outer surface of the one side end part, respectively. The die terminals in the second die may be formed at corresponding positions to contact the die terminals of the first die at the same polarity as described above.

The conductive material is not limited as long as it has a conductive material capable of transferring electrons, but specifically, may be a metal, and more specifically, may be copper (Cu), nickel (Ni), aluminum (Al) or an alloy thereof. Here, the conductive material may be specifically determined depending on whether it is the (+) die terminal or the (−) die terminal, wherein the material is preferably the same material as the electrode terminals of the processing battery cell in electrical contact or a material having a low contact resistance. Specifically, the (+) die terminal connected to the cathode terminal of the processing battery cell may be formed of aluminum or nickel, and the (−) die terminal connected to the anode terminal of the processing battery cell may be formed of copper or nickel.

When such die terminals are included, the peripheral portion of the die terminal may be formed of the heat resistant material such as plastic in order to prevent the above-described problems such as short-circuit, etc.

The term "peripheral portion" used herein means a portion that is a predetermined distance away from the constitution of the object, and specifically, it means all or a part of an outer surface based on both side end parts of the recessed part in a direction in which the electrode terminals of the processing battery cell protrude, in consideration of the portions where the electrode terminals abut and the portions where the die terminals are placed.

Meanwhile, according to an embodiment of the present invention, the second die of the curing die may have a structure in which an additional recessed part is formed at a position corresponding to the recessed part of the first die, which is the same as the first die, and the second die may have a flat structure without the recessed part. Here, the total depth of the recessed parts formed in the dies may be set so that the recessed parts where the first die and the second die are combined correspond to a depth of the processing battery cell. Here, the depth of the recessed part may be varied depending on the thickness of the processing battery cell, and the bottom of the recessed part may have a mechanically movable structure so that the depth of the recessed part may be adjusted according to the situation.

In addition, according to an embodiment of the present invention, the first die and the second die may be independent members, but specifically, may have a structure in which the one side end parts are interconnected by a hinge as one member.

Another embodiment of the present invention provides a method for manufacturing a gel polymer battery cell using the curing die as described above.

Specifically, the method for manufacturing a gel polymer battery cell using the curing die includes:

(i) preparing a processing battery cell including an electrode assembly and a composition for forming a gel polymer electrolyte inside a battery case;

(ii) mounting the processing battery cell in a recessed part of the curing die and closing the processing battery cell;

(iii) controlling the curing die to thereby gel the composition for forming a gel polymer electrolyte in the battery case by a cross-linking reaction;

Here, the controlling of the curing die to thereby gel the composition for forming a gel polymer electrolyte in the battery case by a cross-linking reaction may be performed by placing the curing die mounted with the processing battery cell in an oven and controlling a temperature in the oven, or applying a current to a heating wire of the curing die, thereby heating the die to gel the composition for forming a gel polymer electrolyte.

As described above, when the curing die does not include the heating wire, the composition for forming a gel polymer electrolyte may be gelled by placing the curing die in the oven and controlling the temperature. In view of simplification of the process, etc., the curing die including the heating wire may be used to gel the composition by itself.

Here, according to an embodiment of the present invention, the temperature for the cross-linking reaction of the composition for forming a gel polymer electrolyte may be 30 to 100 degrees Celsius.

The cross-linking reaction means that the initiator included in the composition for forming a gel polymer electrolyte forms a radical to initiate cross-linking so that a reactive monomer or oligomer forms a polymer. Here, the temperature of the initiator needs to be raised up to the temperature at which the initiator forms the radical to initiate the cross-linking. At this time, the temperature may vary depending on the kind of the initiator, but most of the initiators initiate the cross-linking within the above-described range. Thus, the temperature for the cross-linking is preferably within the above-described range in view of energy efficiency, etc.

The composition for forming a gel polymer electrolyte may include a lithium salt and an electrolytic solution solvent together with the above-mentioned initiator and the reactive monomer or oligomer.

The initiator may include organic peroxides or hydroperoxides such as benzoyl peroxide, acetyl peroxide, dilauryl peroxide, di-tert-butyl peroxide, t-butyl peroxy-2-ethyl-hexanoate, cumyl hydroperoxide, hydrogen peroxide, etc., or azo compounds such as 2,2'-azobis(2-cyanobutane), 2,2'-azobis(methylbutyronitrile), 2,2'-azobis(iso-butyronitrile) (AIBN), 2,2'-azobisdimethylvaleronitrile (AMVN), etc.

The polymerization initiator may have a content of 0.01 to 2 parts by weight based on 100 parts by weight of the composition for forming a gel polymer electrolyte. When the content of the polymerization initiator is less than 0.01 part by weight, gelation may not be performed well. When the content thereof is more than 2 parts by weight, the gelation may occur too early or an unreacted initiator may remain to adversely affect battery performance.

The reactive monomer or oligomer includes tetraethylene glycol diacrylate, polyethylene glycol diacrylate (molecular weight of 50 to 20,000), polyethylene glycol dimethacrylate), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, poly(ethylene glycol) diglycidyl ether, 1,5-hexadiene diepoxide, glycerol propoxylate triglycidyl ether, vinylcyclohexene dioxide, 1,2,7,8-diepoxyoctane, 4-vinylcyclohexene dioxide, butyl glycidyl ether, diglycidyl 1,2-cyclohexanedicarboxylate, ethylene glycol diglycidyl ether, glycerol triglycidyl ether, glycidyl methacrylate, etc., but is not limited thereto, and these monomers may be used alone or in combination of two or more.

The reactive monomer or oligomer may have a content of 0.5 to 10 parts by weight based on 100 parts by weight of the composition for forming a gel polymer electrolyte. When the content is less than 0.5 part by weight, it is difficult to form a gel polymer electrolyte, and when the content is more than 10 parts by weight, not only a dense gel polymer electrolyte may be formed, but also ionic conductivity of the battery may be decreased due to a small content of the electrolytic solution solvent in the electrolyte, and resistance may increase to deteriorate the performance of the battery.

The lithium salt is a material that is favorable to be dissolved in the electrolytic solution solvent. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4F_9SO_3$, $Li(CF_3SO_2)3C$, $LiAsF_6$, $LiSbF_6$, $LiAlCl_4$, $CH_3SO_3Li$, $(CF_3SO_2)_2NLi$, chloroborane lithium, lower aliphatic carbonic acid lithium, 4 phenyl boric acid lithium, imide, etc., may be used The content of the lithium salt may be 3 to 40 parts by weight based on 100 parts by weight of the composition for forming a gel polymer electrolyte, but is not limited thereto. When the content thereof is less than 3 parts by weight, it is difficult to function as an electrolyte since a concentration of lithium ions is extremely low. When the content thereof is more than 40 parts by weight, a solubility problem of the lithium salt and a decrease in ion conductivity of the electrolyte may occur.

As the electrolytic solution solvent, cyclic carbonate, linear carbonate, lactone, ether, ester, sulfoxide, acetonitrile, lactam, ketone, and a halogen derivative thereof, etc., may be used, respectively, or in combination of two or more.

Examples of the cyclic carbonate include ethylene carbonate (EC), propylene carbonate (PC), butylene carbonate (BC), fluoroethylene carbonate (FEC), etc. Examples of the linear carbonate include diethyl carbonate (DEC), dimethyl carbonate (DMC), dipropyl carbonate (DPC), ethyl methyl carbonate (EMC), methyl propyl carbonate (MPC), etc. Examples of the lactone include gamma butyrolactone (GBL), and examples of the ether include dibutyl ether, tetrahydrofuran, 2-methyltetrahydrofuran, 1,4-dioxane, 1,2-dimethoxyethane, 1,2-diethoxyethane, etc. Examples of the ester include methyl formate, ethyl formate, propyl formate, methyl acetate, ethyl acetate, propyl acetate, methyl propionate, ethyl propionate, butyl propionate, methyl pivalate, etc. Further, examples of the sulfoxide include dimethylsulfoxide, etc., examples of the lactam include N-methyl-2-pyrrolidone (NMP), and examples of the ketone include polymethylvinyl ketone. Further, the halogen derivative thereof may also be used. The electrolytic solution solvent is not limited to the above-exemplified electrolytic solution solvents. Further, these electrolytic solution solvents may be used alone or in combination of two or more.

A content of the electrolytic solution solvent may be 0.1 to 98 parts by weight based on 100 parts by weight of the composition for forming a gel polymer electrolyte, but is not limited thereto. When the content is less than 0.1 parts by weight, ionic conductivity of the electrolyte may be lowered. When the content is more than 98 parts by weight, mechanical properties of the electrolyte may be decreased, and thus, it may be difficult to be manufactured in a thin film form.

Meanwhile, further, the method for manufacturing a gel polymer battery cell may further include connecting die terminals of the curing die to a charge and discharge device to perform an activation process of the processing battery cell.

As described above, the curing die according to the present invention may include the die terminals formed of a conductive material at positions in contact with the electrode terminals of the processing battery cell, respectively, and thus, the die terminals may be connected to the charge and discharge device to perform the charge and discharge process, thereby activating the battery cell. As described above, not only the manufacturing of the gel polymer electrolyte but also the activation process may be continuously performed by using the single die, and thus, it is possible to simplify the process for manufacturing the gel polymer battery cell.

In the present invention, the temperature controller for controlling the temperature by applying a current when the curing die includes the heating wire and the charge and discharge device for flowing a current when the curing die includes the die terminals are able to have all known structures, and thus, separate description thereof will not be provided.

Meanwhile, as described above, the processing battery cell may include an unsealing part at one side portion thereof.

The unsealed part of the processing battery cell is extended from a side surface of a battery cell body where the electrode terminals are not formed, and maintains a sealed state by the first die and the second die by placing the unsealed part at an outside of the recessed part when being mounted in the curing die for cross-linking reaction of the composition for forming a gel polymer electrolyte. Thus, it is possible to prevent the composition from flowing out to the unsealed part from an accommodating part of the battery case including the electrode assembly embedded where the composition is mainly distributed, and accordingly, it is possible to prevent solve the problem that the sealing strength is weakened at the time of resealing.

As a constitution of the battery cell, the electrode assembly included in the battery case includes a cathode and an anode so as to perform the charge and discharge process. For example, the electrode assembly may be formed in a structure in which the cathode and the anode are stacked with a separator interposed therebetween by a folding (jelly-roll) method, a stacking method, or a stack/folding method.

The cathode is manufactured by applying a mixture of a cathode active material, a conductive material, and a binder on a cathode current collector, followed by drying and pressing. If necessary, a filler may be further added to the mixture.

The cathode current collector generally has a thickness of 3 to 500 μm. Such a cathode current collector is not specifically limited as long as it has high conductivity without causing chemical changes in the battery, and for example, stainless steel, aluminum, nickel, titanium, sintered carbon, or an aluminum or stainless steel surface that is surface-treated with carbon, nickel, titanium, silver, etc., may be used for the cathode current collector. The current collector may have fine irregularities formed on a surface thereof to increase adhesive force of the cathode active material, and various forms such as a film, a sheet, a foil, a net, a porous body, a foam, and a non-woven fabric body, etc., are possibly used.

The cathode active material may include a layered compound such as lithium cobalt oxide ($LiCoO_2$) or lithium nickel oxide ($LiNiO_2$) or a compound substituted with one or more transition metals; a lithium manganese oxide such as Chemical Formula $Li_{1+x}Mn_{2-x}O_4$ (where x is 0 to 0.33), $LiMnO_3$, $LiMn_2O_3$, $LiMnO_2$, or the like, a lithium copper oxide ($Li_2CuO_2$); a vanadium oxide such as $LiV_3O_8$, $LiFe_3O_4$, $V_2O_5$, $Cu_2V_2O_7$, or the like; a Ni-site type lithium nickel oxide represented by Chemical Formula $LiNi_{1-x}MxO_2$ (where M is Co, Mn, Al, Cu, Fe, Mg, B or Ga and x is 0.01 to 0.3); a lithium manganese complex oxide represented by Chemical Formula $LiMn_{2-x}MxO_2$ (where M is Co, Ni, Fe, Cr, Zn or Ta, x is 0.01 to 0.1) or $Li_2Mn_3MO_8$ (where M is Fe, Co, Ni, Cu or Zn); a lithium manganese composite oxide having a spinel structure represented by $LiNi_xMn_{2-x}O_4$; $LiMn_2O_4$ in which a part of Li in Chemical Formula is substituted with an alkaline earth metal ion; a disulfide compound; $Fe_2(MoO_4)_3$, etc., but is not limited thereto.

The conductive material is usually added in a content of 1 to 30 wt % based on the total weight of the mixture including the cathode active material. Such a conductive material is not specifically limited as long as it has conductivity without causing chemical change in the battery. For example, graphite such as natural graphite, artificial graphite, or the like; carbon black such as carbon black, acetylene black, Ketjen black, channel black, furnace black, lamp black, thermal black, or the like; conductive fiber such as carbon fiber, metal fiber, or the like; metal powder such as carbon fluoride, aluminum, nickel powder, or the like; conductive whiskey such as zinc oxide, potassium titanate, or the like; conductive metal oxide such as titanium oxide; or the like; a conductive material such as a polyphenylene derivative, or the like, may be used.

The binder is a component which assists in bonding of the active material, the conductive material, etc., and bonding to the current collector, and is usually added in a content of 1 to 30 wt % based on the total weight of the mixture including the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, Polypropylene, ethylene-propylene-diene terpolymer (EPDM), sulfonated EPDM, styrene butylene rubber, fluorine rubber, various copolymers, etc.

The filler is optionally used as a component for suppressing expansion of the cathode, and is not specifically limited as long as it is a fibrous material without causing chemical change in the battery. For example, an olefin polymer such as polyethylene, polypropylene, or the like; or a fibrous material such as glass fiber, carbon fiber, or the like, is used for the filler.

The anode is manufactured by applying, drying and pressing the anode active material on an anode current collector, and if necessary, may optionally further include the above-described conductive material, binder, filler, etc.

The anode current collector generally has a thickness of 3 to 500 μm. Such an anode current collector is not specifically limited as long as it has conductivity without causing chemical changes in the battery, and for example, carbon, stainless steel, aluminum, nickel, titanium, sintered carbon, or a copper or stainless steel surface that is surface-treated with carbon, nickel, titanium, silver, etc., or an aluminum-cadmium alloy, or the like, may be used for the anode current collector. In addition, similar to the cathode current collector, the anode current collector may have fine irregularities formed on a surface thereof to enhance bonding force of the anode active material, and various forms such as a film, a sheet, a foil, a net, a porous body, a foam, and a non-woven fabric body, etc., are possibly used.

The anode active material may include, for example, carbon such as non-graphitized carbon, graphite carbon, or the like; a metal complex oxide such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, Group 1, Group 2 and Group 3 elements of the Periodic Table, halogen; $0 < x \leq 1$; $1 \leq y \leq 3$; $1 \leq z \leq 8$), or the like; a lithium metal; a lithium alloy; a silicon-based alloy; a Tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; a conductive polymer such as polyacetylene, or the like; a Li—Co—Ni-based material, etc.

Description of the binder, the conductive material, and the filler added as necessary is the same as that in the cathode.

The separator is interposed between the cathode and the anode, and an insulating thin film having high ion permeability and mechanical strength is used for the separator. The separator generally has a pore diameter of 0.01 to 10 μm and a thickness of 5 to 300 μm. For the separator, for example, an olefin-based polymer such as polypropylene, which is chemically resistant and hydrophobic, or the like; a sheet or a nonwoven fabric formed of glass fiber, polyethylene, or the like, is used. When a solid electrolyte such as a polymer, or the like, is used as an electrolyte, the solid electrolyte may also serve as the separator.

Yet another embodiment of the present invention provides a gel polymer battery cell, a battery pack including one or more of the gel polymer battery cells as unit cells, and further, a device including the battery pack.

Specific examples of the device may include a mobile electronic device, a power tool powered by an electric motor; an electric vehicle including an electric vehicle (EV), a hybrid electric vehicle (HEV), a plug-in hybrid electric vehicle (PHEV), or the like; an electric motorcycle including an electric bike (E-bike), or an electric scooter (E-scooter); an electric golf cart; a power storage system, or the like, but the present invention is not limited thereto.

Since the structure of such a device and the method for manufacturing the device are well known in the art, a detailed description thereof will be omitted herein.

MODE FOR INVENTION

Figure 1:
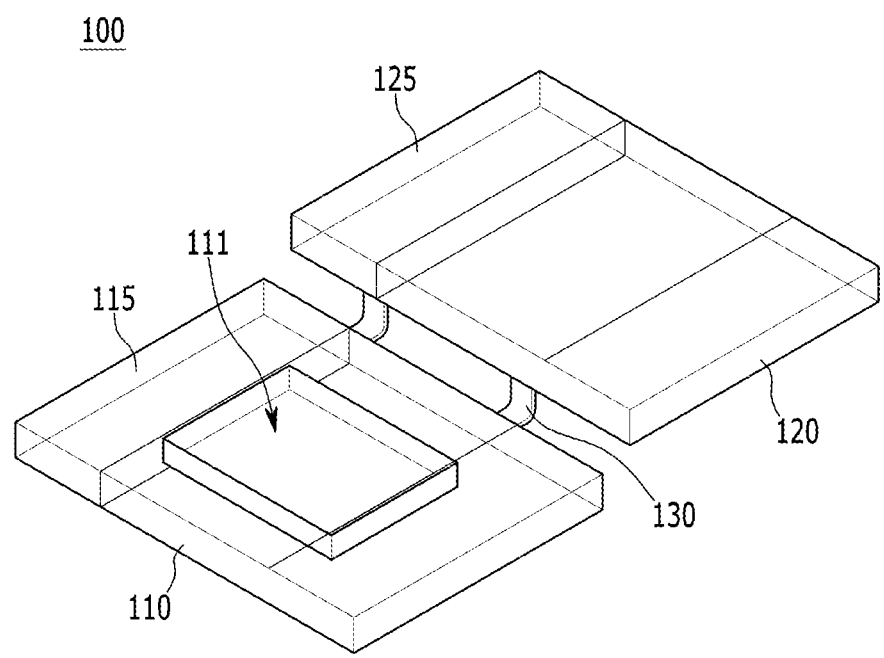
FIG. 1 is a schematic view of a curing die according to an embodiment of the present invention.

Hereinafter, the present invention will be described in detail with reference to the drawings, but the scope of the present invention is not limited thereto.

FIGS. 1 to 7 schematically show curing dies 100, 200, 300, 400, 500, 600 and 700 according to exemplary embodiments of the present invention.

First, referring to FIGS. 1 to 7 together, the curing dies 100, 200, 300, 400, 500, 600, and 700 according to the present invention may include first dies 110, 210, 310, 410, 510, 610, 710, 810, and 910 including recessed parts 111, 211, 311, 411, 511, 611, and 711 in which processing battery cells including an electrode assembly and a composition for forming a gel polymer electrolyte inside a battery case are mounted; and second dies 120, 220, 320, 420, 520, 620, 720, 820, and 920 coupled to the first dies 110, 210, 310, 410, 510, 610, 710, 810, and 910 so as to close the processing battery cells mounted in the recessed parts 111, 211, 311, 411, 511, 611, and 711. One side end parts of the first dies 110, 210, 310, 410, 510, 610, 710, 810, and 910 and the second dies 120, 220, 320, 420, 520, 620, 720, 820, and 920 may be interconnected by hinges 130, 230, 330, 430, 530, 630, 730, 830, and 930. Further, the curing dies 100, 200, 300, 400, 500, 600, and 700 according to the present invention may include portions formed of a heat conductive material to transfer heat to the composition so that an initiator reaches a temperature sufficient to initiate a reaction for the cross-linking reaction of the composition for forming a gel polymer electrolyte in the processing battery cell mounted therein. Here, portions of the heat conductive material in the drawings are colored and non-colored portions are shown as white (or translucent white).

Hereinafter, difference will be described for each of drawings.

Referring to FIG. 1, the curing die 100 may include a first die 110 in which a recessed part 111 mounted with a processing battery cell is formed and a second die 120 having a flat structure without the recessed part that is connected to the first die 110 by a hinge 130, wherein a peripheral portion of a portion that abuts the electrode terminal of the processing battery cell, that is, outer surface entire portions 115 and 125 based on the both side end parts of the recessed part in the direction in which the electrode terminals of the processing battery cell protrude may be formed of a heat resistant material such as plastic, or the like, and the other portion may be formed entirely of a heat conductive material.

Figure 2:
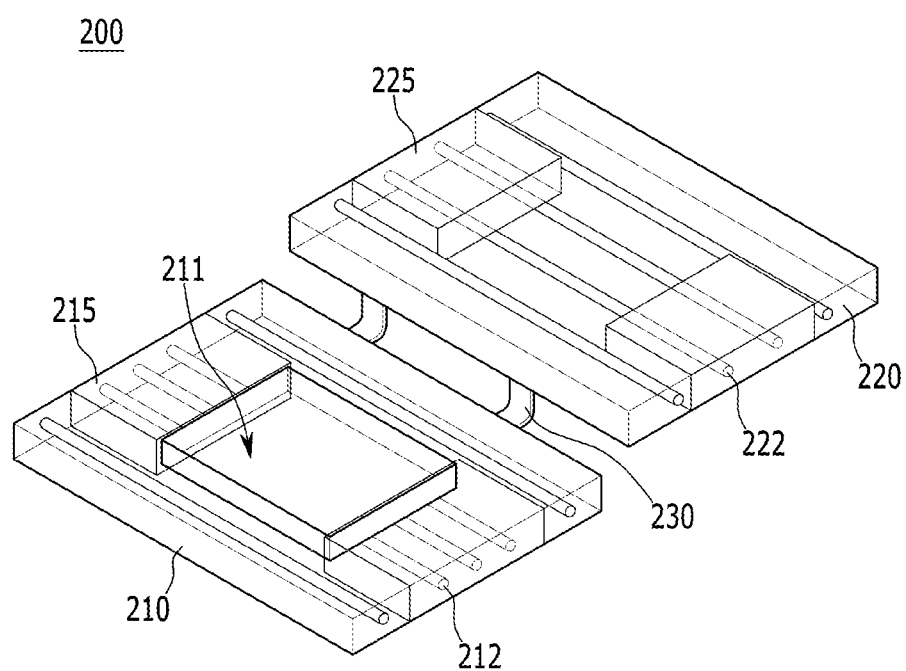
FIG. 2 is a schematic view of a curing die according to another embodiment of the present invention.

Referring to FIG. 2, which is the same as in FIG. 1, the curing die 200 includes a first die 210 in which a recessed part 211 mounted with a battery cell is formed and a second die 220 having a flat structure without the recessed part that is connected to the first die 210 by a hinge 230. Meanwhile, in the curing die, a peripheral portion of a portion that abuts the electrode terminal of the processing battery cell, that is, portions of outer surfaces 215 and 225 based on the both side end parts of the recessed part in the direction in which the electrode terminals of the processing battery cell protrude may be formed of a heat resistant material such as plastic, or the like, and the other portion may be formed entirely of a heat conductive material.

Meanwhile, further, the first die 210 and the second die 211 in the curing die 200 of FIG. 2 include, respectively, heat wires 212 and 222 therein so as to perform its own heating. Here, the heating wires 212 and 222 may be formed more tightly in the vicinity of the recessed part 211, which is a portion where the processing battery cell is mounted, like the heating wire 212 of the first die 210, etc., that is, may be appropriately distributed in view of efficiency, and may be uniformly distributed, like the heating wire 222 of the second die 220.

Figure 3:
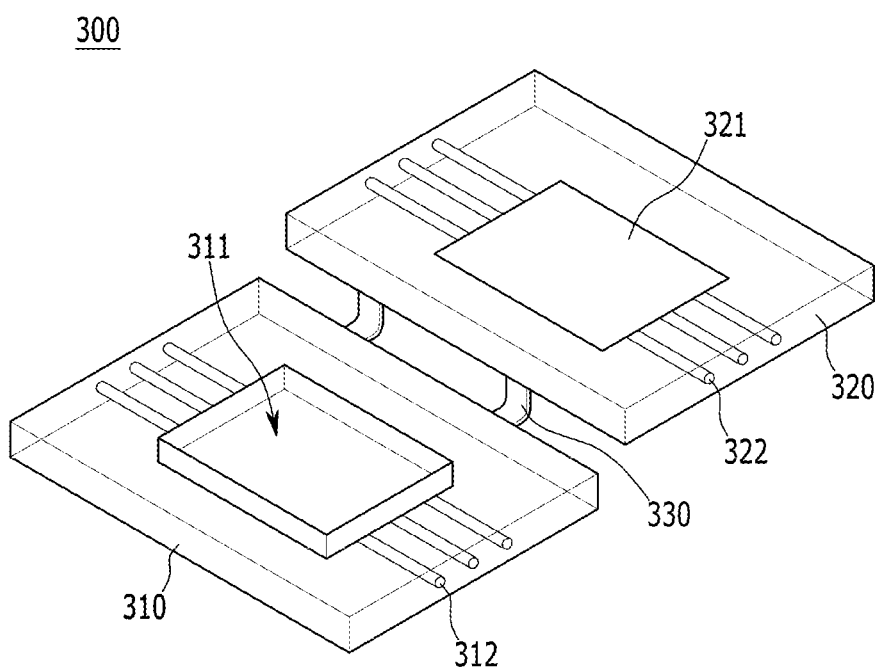
FIG. 3 is a schematic view of a curing die according to another embodiment of the present invention.

Referring to FIG. 3, which is the same as in FIGS. 1 and 2, the curing die 300 may have a structure including a first die 310 in which a recessed part 311 mounted with a battery cell is formed and a second die 320 having a flat structure without the recessed part that is connected to the first die 310 by a hinge 330. However, an entire of the recessed part 311 of the first die 310, and only a portion 321 of the second die 320 that faces thereto may be formed of a heat conductive material at corresponding areas. The first die 310 and the second die 320 may include heating wires 312 and 322 in the recessed part 311 formed of the heat conductive material and in the portion 321 facing thereto, respectively, so as to perform its own heating of the curing die 300.

When the first die 310 and the second die 320 substantially include the heating wires 312 and 322, only the portion at which the processing battery cell is mounted is efficiently heat transferred, and thus, in consideration of manufacturing cost aspect, or the like, only the recessed part 311 and the portion 321 facing the recessed part 311 may be formed of a heat conductive material and the heating wires 312 and 322 may be distributed only to the corresponding portions as shown in FIG. 3. Naturally, the heating wire may be entirely distributed, and its position may vary, and is not limited to drawings.

Figure 4:
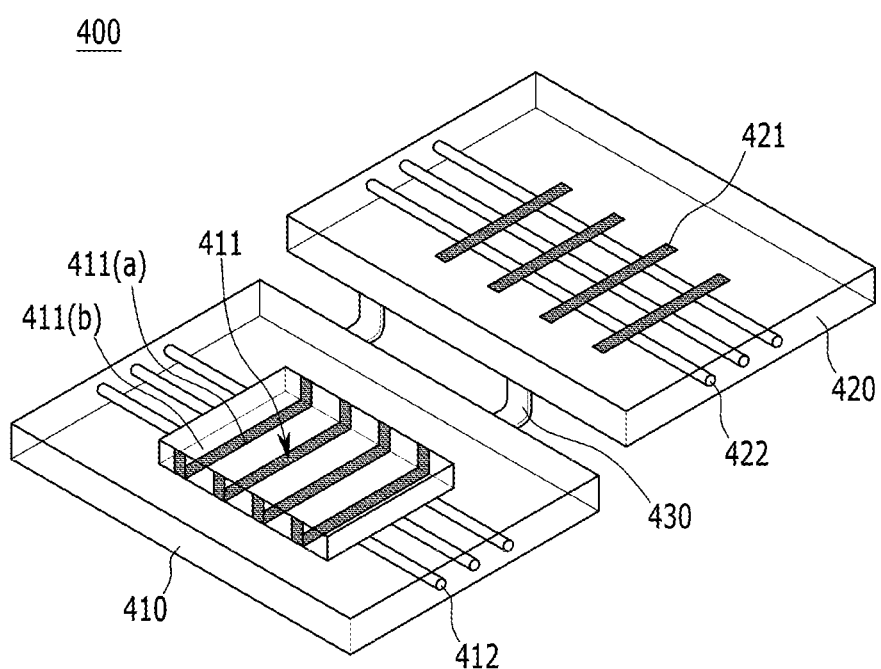
FIG. 4 is a schematic view of a curing die according to another embodiment of the present invention.

Referring to FIG. 4, which is the same as in FIGS. 1 to 3, the curing die 400 may have a structure including a first die 410 in which a recessed part 411 mounted with a battery cell is formed and a second die 420 having a flat structure without the recessed part that is connected to the first die 410 by the hinge 430. However, only a portion 411(a) in the recessed part 411 of the first die 410, and a portion 421 of the second die 420 that faces the recessed part 411 may be formed of a heat conductive material at corresponding areas (that is, the recessed part 411 of the first die 410 may have a structure including a portion 411(a) formed of the heat conductive material and a portion 411(b) which is not formed of the heat conductive material). Here, FIG. 4 shows a structure in which the portion 411(a) formed of the heat conductive material and the portion 411(b) which is not formed of the heat conductive material are alternately arranged in a strip shape, but the present invention is not limited thereto, and these portions may have various shapes such as circular, diagonal, lattice shapes, etc.

Further, since the curing die 400 includes the heat conductive material only in the recessed part 411 and the portion 421 facing thereto which is the same as in FIG. 3, the first die 410 and the second die 420 of the curing die 400 may also include heating wires 412 and 422 at the recessed part 411 formed of the heat conductive material and the portion 421 facing thereto, respectively.

Figure 5:
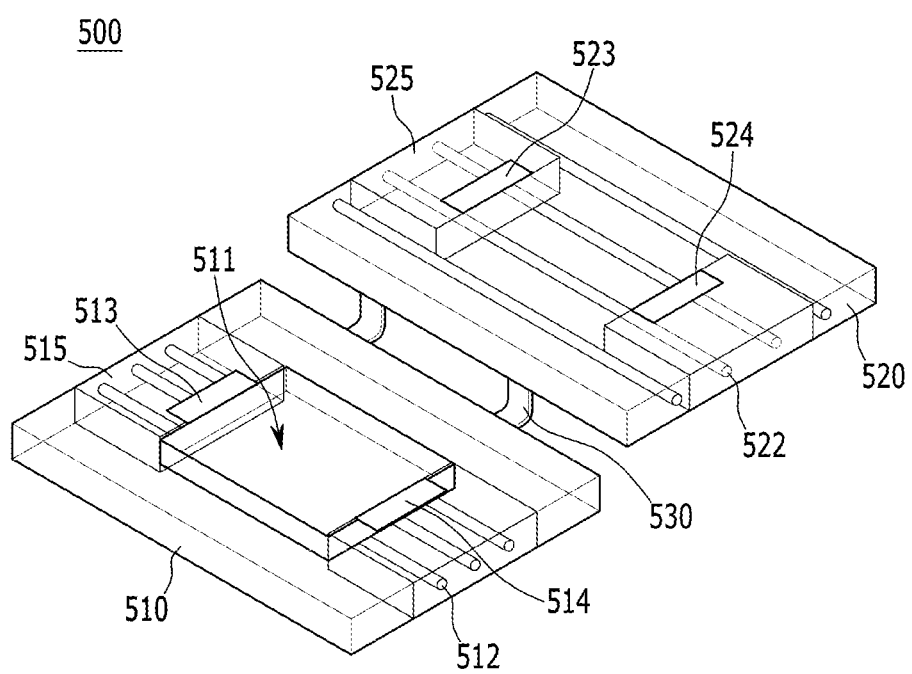
FIG. 5 is a schematic view of a curing die according to another embodiment of the present invention.
Figure 6:
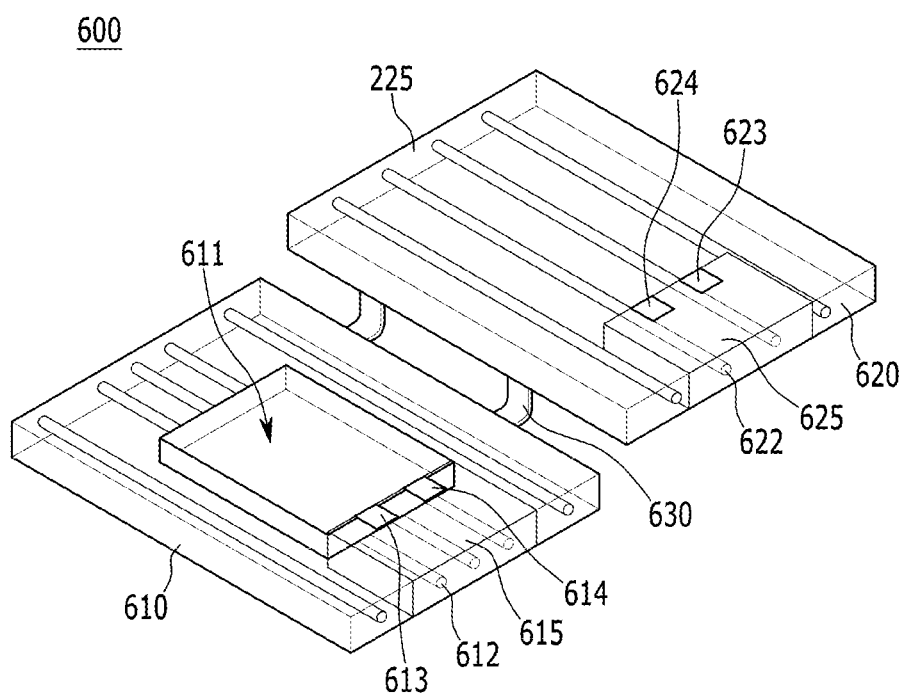
FIG. 6 is a schematic view of a curing die according to another embodiment of the present invention.

Referring to FIGS. 5 and 6 together, which are the same as in FIG. 2, the curing dies 500 and 600 may include first dies 510 and 610 in which recessed parts 511 and 611 mounted with battery cells are formed and second dies 520 and 620 each having a flat structure without the recessed part that is connected to the first dies 510 and 610 by the hinges 530 and 630, respectively, wherein a peripheral portion of a portion that abuts the electrode terminal of the processing battery cell, that is, portions of outer surfaces 515, 525, 615, and 625 based on the both side end parts of the recessed part in the direction in which the electrode terminals of the processing battery cell protrude may be formed of a heat resistant material such as plastic, or the like, and the other portion may be formed entirely of a heat conductive material. The first dies 510 and 610 and the second dies 511 and 611 include first and second heating wires 512, 522, 612, and 622 therein, respectively, so as to be heated by themselves.

Meanwhile, the curing dies 500 and 600 further include the die terminals 513, 514, 523, 524, 613, 614, 623, and 624 of the conductive material in contact with the electrode terminals of the processing battery cell so that the process is simplified by performing the cross-linking reaction for manufacturing the gel polymer electrolyte and continuously performing the activation process.

Here, the die terminals 513, 514, 523, 524, 613, 614, 623 and 624 are formed at positions in contact with the electrode terminals of the processing battery cell mounted with the first dies 510 and 610 and the second dies 520 and 620.

Accordingly, the die terminals 513, 514, 523, 524, 613, 614, 623, and 624 include (+) die terminals 513, 523, 613, and 623 in contact with the cathode terminals of the processing battery cell, and (−) die terminals 514, 524, 614, and 624 in contact with the anode terminals of the processing battery cell, respectively, so as to contact the electrode terminals of the processing battery cell to thereby perform the charge and discharge process.

For this reason, at the positions of the die terminals, structures of the curing dies 500, 600 as shown in FIGS. 5 and 6 are provided. Specifically, formation positions of the (+) die terminals 513, 523, 613, and 623 and the (−) die terminals 514, 524, 614, and 624 depend on a positional relationship with the electrode terminals of the processing battery cell to be mounted.

First, referring to FIG. 5, in order to apply a bidirectional battery cell in which the electrode terminals of the battery cell protrude in different directions at one side end part and the other side end part of the battery cell, the curing die 500 may have a structure in which in the first die 510, the (+) die terminal 513 and the (−) die terminal 513 may be formed on the outer surface of one side end part and on an outer surface of the other side end part opposite to the outer surface of the one side end part in the recessed part 511, respectively, and in the second die 520, the (+) die terminal 523 and the (−) die terminal 524 are formed, respectively, at corresponding positions so that the first die 510 and the second die 520 are in contact with each other at the same polarity when the first die 510 and the second die 520 are coupled.

On the other hand, referring to FIG. 6, in order to apply the unidirectional battery cell in which the electrode terminals of the battery cell protrude in the same direction, the curing die 600 may have a structure in which in the first die 610, both the (+) die terminal 613 and the (−) die terminal 614 are independently formed on an outer surface of one side end part of the recessed part, and in the second die 620, the (+) die terminal 623 and the (−) die terminal 624 are formed, respectively, at corresponding positions so that the first die and the second die are in contact with each other at the same polarity when the first die 610 and the second die 620 are coupled.

Figure 7:
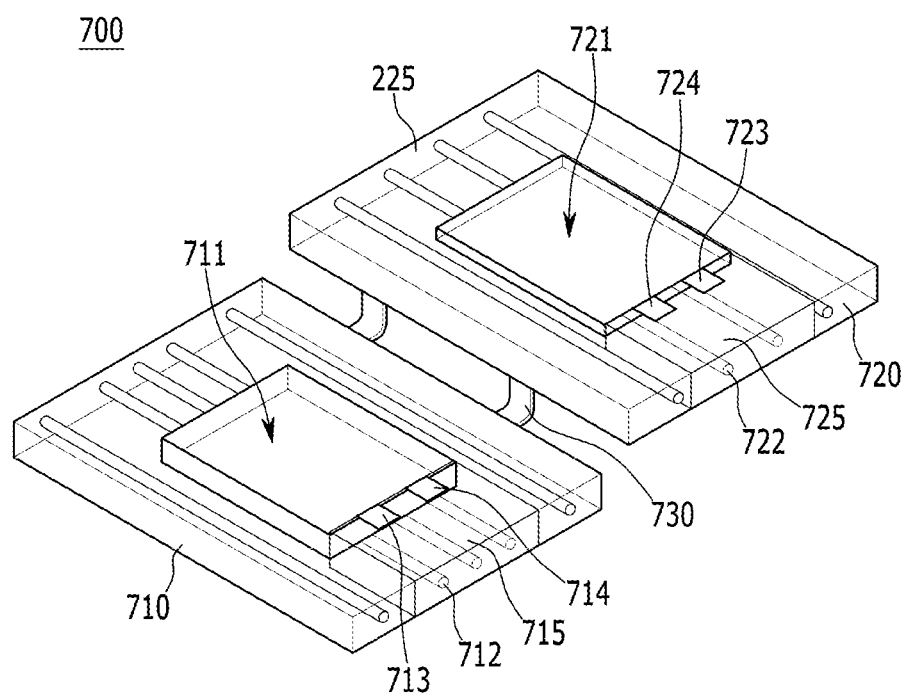
FIG. 7 is a schematic view of a curing die according to another embodiment of the present invention.

Lastly, referring to FIG. 7, similar to FIG. 6, the curing die 700 includes a first die 710 in which a recessed part 711 mounted with the battery cell is formed and a second die 720 connected to the first die 710 by a hinge 730, wherein a peripheral portion of a portion that abuts the electrode terminal of the processing battery cell, that is, portions of outer surfaces 715 and 725 based on the both side end parts of the recessed part in the direction in which the electrode terminals of the processing battery cell protrude may be formed of a heat resistant material such as plastic, or the like, and the other portion may be formed entirely of a heat conductive material. The first die 710 and the second die 711 include first and second heating wires 712 and 722 therein, respectively, so as to be heated by themselves. Further, in order that the activation process is able to be performed after the cross-linking reaction of the gel polymer electrolyte, in the first die 710, both the (+) die terminal 713 and (−) die terminal 714 are formed, independently, on the outer surface of one side end part of the recessed part, and in the second die 720, the (+) die terminal 723 and (−) die terminal 724 are formed, respectively, at corresponding positions so that the first die 710 and the second die 720 are in contact with each other at the same polarity when the first die 710 and the second die 720 are coupled.

Meanwhile, unlike FIG. 6, the second die 720 of the curing die 700 may have a structure in which an additional recessed part is formed at a position corresponding to the recessed part of the first die, which is the same as the first die.

Although FIGS. 1 to 7 schematically show the curing dies according to Examples of the present invention, the present invention is not limited to such a structure, and various modifications may be made within a similar range.

FIGS. 8 to 12 schematically show methods for manufacturing the gel polymer battery cells using the curing dies 100, 500 and 600 according to Examples of the present invention.

Figure 8:
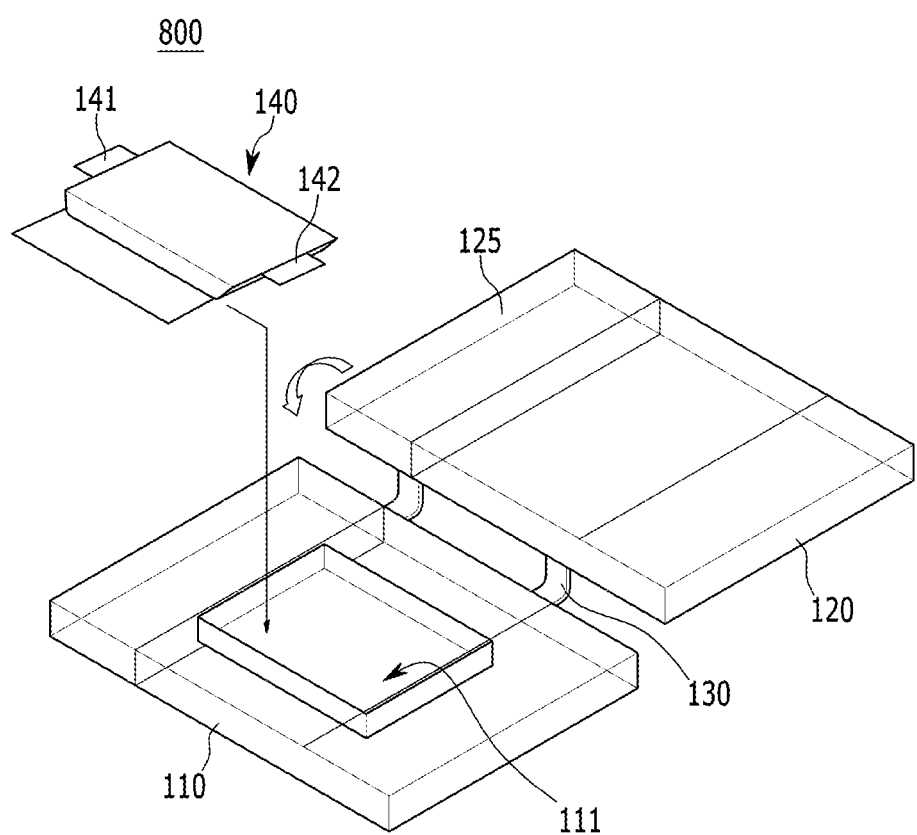
FIG. 8 is a schematic view showing one step of a manufacturing process for proceeding a cross-linking reaction using a curing die according to an embodiment of the present invention.
Figure 9:
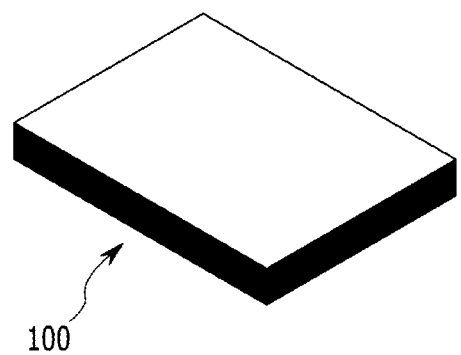
FIG. 9 is a schematic view showing a state in which a first die and a second die are coupled in a state where a processing battery cell is mounted in the curing die in FIG. 8.

First, FIGS. 8 and 9 schematically show a method using the curing die 100 of the present invention.

Referring to FIGS. 8 and 9 together, a processing battery cell 140 in which an electrode assembly and a composition for forming a gel polymer electrolyte are included inside a battery case and electrode terminals 141 and 142 protrude in different directions from one side end part and the other side end part of the battery cell is prepared, the processing battery cell 140 is mounted in the recessed part 111 of the first die 110, and the second die 120 connected to the first die 110 by the hinge 130 is turned upside down, closed, and coupled to the first die 110, thereby closing the processing battery cell 140 as shown in FIG. 9. The curing die 100 does not include a heating wire therein, and thus, is not able to perform its own heating. Thus, the curing die 100 in which the processing battery cell 140 is closed may be placed in the oven, and a temperature in the oven may be controlled to gel the composition for forming a gel polymer electrolyte by the cross-linking reaction, thereby manufacturing the battery cell.

Figure 10:
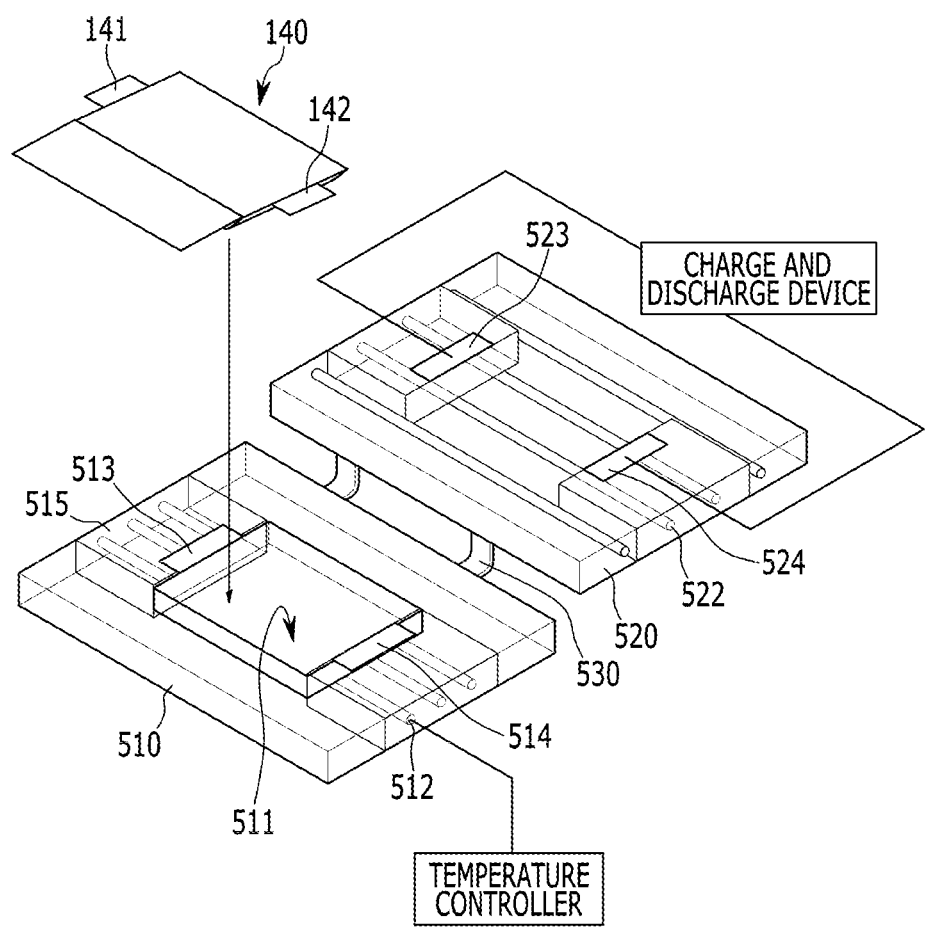
FIG. 10 is a schematic view showing one process of the manufacturing process for proceeding a cross-linking reaction and an activation process using the curing die according to another embodiment of the present invention.
Figure 11:
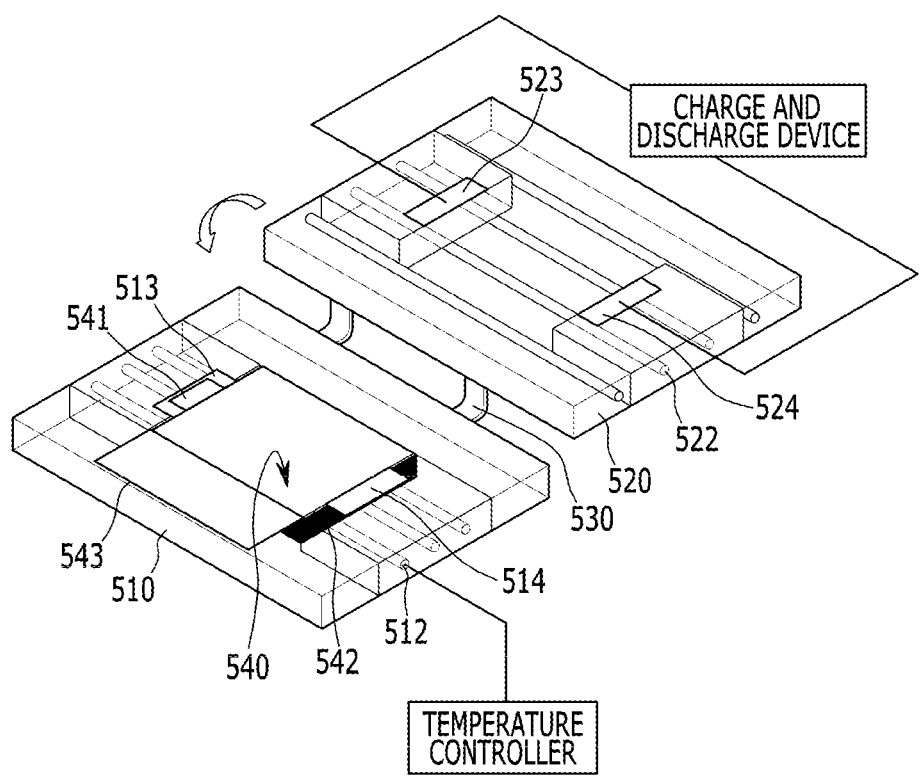
FIG. 11 is a schematic view showing a state in which the processing battery cell is mounted in the curing die in FIG. 10.
Figure 12:
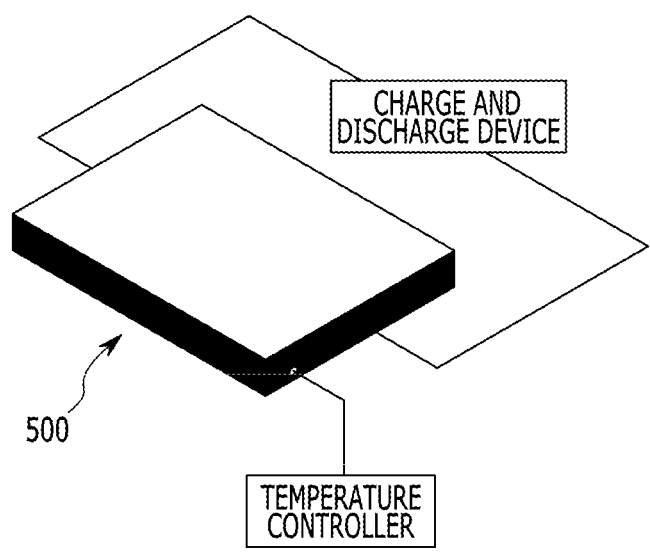
FIG. 12 is a schematic view showing a state in which the first die and the second die are coupled in FIG. 11.

On the other hand, FIGS. 10 to 12 schematically show the method for manufacturing a gel polymer battery cell using the curing die 500 that includes the heating wire enabling its own heating of the curing die and the die terminals enabling the activation process which is performed continuously after manufacturing the gel polymer electrolyte.

First, referring to 10 to 12 together, which are the same as explained in FIG. 8, a processing battery cell 540 in which electrode terminals 541 and 542 protrude in different directions from one side end part and the other side end part of the battery cell is firstly prepared. In the recessed part 511 of the first die 510, the cathode terminal 541 of the processing battery cell 540 is mounted to be in contact with the (+) die terminal 513 of the first die 510 and the anode terminal 542 of the processing battery cell 540 is mounted to be in contact with the (−) die terminal 514 of the first die 510. Here, the unsealed part 543 extending from the side surface of the battery cell body in which the electrode terminals are not formed in the processing battery cell 540 is placed outwardly of the recessed part 511.

Then, the second die 520 connected to the first die 510 by the hinge 530 is turned upside down and closed so that the (+) die terminal 523 of the second die is in contact with the cathode terminal 541 of the processing battery cell 540 and the (−) die terminal 524 of the second die is in contact with the anode terminal 542 of the processing battery cell 540, and then, is coupled to the first die 510, thereby closing the processing battery cell 140 as shown in FIG. 12.

As described above, when the unsealed part 543 of the processing battery cell 540 is placed outside the recessed part 511 of the first die 510 and the first die 510 is coupled to the second die 520, the unsealed part 543 may maintain the sealed state by the first die 510 and the second die 520, and thus, it is possible to prevent the composition for forming a gel polymer electrolyte from flowing out to the unsealed part from the accommodating part of the battery case including the electrode assembly embedded, thereby solving the problem that the sealing strength is weakened at the time of resealing.

Next, the temperature controller for flowing a current to the heating wires 512 and 522 of the first die and the second die of the curing die 500 in which the processing battery cell 540 is closed may be connected to the curing die, and the curing die may be heated from 30 to 100 degrees Celsius to gel the composition for forming a gel polymer electrolyte. When the gel polymer electrolyte is formed, the charge and discharge device may be connected to the die terminals 513, 514, 523, and 524 of the first die 510 and the second die 520 to perform the activation process.

When the curing die according to the present invention is used as described above, since the cross-linking reaction of the composition for forming a gel polymer electrolyte is generated in a fixed frame, it is possible to manufacture the gel polymer battery cell having a uniform appearance, and further, to perform even the activation process continuously, thereby simplifying the process.

Specific connection of the heating wire and the temperature controller, or specific connection of the die terminals and the external charge and discharge device is not shown in FIGS. 10 to 12. However, these constitutions are easily known from the known art by those skilled in the art, and thus a detailed description thereof will be omitted.

It will be appreciated by those skilled in the art that various modifications and change can be made without departing from the spirits and scope of the appended claims of the present invention.

INDUSTRIAL APPLICABILITY

As described above, the curing die according to the present invention may have a structure in which the processing battery cell including the composition for forming a gel polymer electrolyte is able to be mounted in the curing die, and thus the composition may be uniformly distributed in the battery case at the cross-linking reaction, thereby making possible to manufacture the gel polymer battery cell having a uniform appearance. Further, since the composition may be prevented from flowing out to the unsealed portion of the battery case, the electrolytic solution may not be cured in the unsealed portion, and thus it is possible to solve the problem that the sealing strength is weakened at the time of resealing.

Further, the curing die according to the present invention may include the heating wire in the curing die itself, thereby performing its own heating. Thus, the composition may be gelated more simply without the need of storing in the oven separately.

Further, since the curing die according to the present invention includes the die terminals contacting with the electrode terminals of the processing battery cell in the curing die itself, the activation process may be performed together with the charge and discharge process, thereby simplifying the process.

The invention claimed is:

1. A curing die for manufacturing a gel polymer electrolyte, comprising:
   a first die including a recessed part in which a processing battery cell is mounted, the processing battery cell including an electrode assembly and a composition for forming a gel polymer electrolyte inside a battery case, the battery case including an unsealed part at one side portion is mounted; and a second die coupled to the first die so as to close the processing battery cell mounted in the recessed part, wherein at least one of the first die or the second die is partly or entirely formed of a heat conductive material, and a portion of the recessed part is formed of the heat conductive material and a portion of the recessed part is not formed of the heat conductive material.

2. The curing die for manufacturing a gel polymer electrolyte of claim 1, wherein:

a portion of the second die that faces the recessed part of the first die is partly or entirely formed of a heat conductive material.

3. The curing die for manufacturing a gel polymer electrolyte of claim 1, wherein:

at least one of the first die and the second die includes a heating wire connected to a temperature controller.

4. The curing die for manufacturing a gel polymer electrolyte of claim 1, wherein:

the first die and the second die each include die terminals formed of a conductive material at positions in contact with electrode terminals of the processing battery cell, and the die terminals are connected to an external charge and discharge device.

5. The curing die for manufacturing a gel polymer electrolyte of claim 4, wherein:

the die terminals formed on the first die and the die terminals formed on the second die are formed at corresponding positions so that the first die and the second die are in contact with each other at the same polarity when the first die and the second die are coupled.

6. The curing die for manufacturing a gel polymer electrolyte of claim 4, wherein:

the die terminals include a (+) die terminal in contact with a cathode terminal of the processing battery cell and a (−) die terminal in contact with an anode terminal of the processing battery cell.

7. The curing die for manufacturing a gel polymer electrolyte of claim 6, wherein:

in the first die, the (+) die terminal and the (−) die terminal are independently formed on an outer surface of one side end part of the recessed part.

8. The curing die for manufacturing a gel polymer electrolyte of claim 6, wherein:

in the first die, the (+) die terminal and the (−) die terminal are formed on the outer surface of one side end part of the recessed part and on an outer surface of the other side end part opposite to the outer surface of the one side end part, respectively.

9. The curing die for manufacturing a gel polymer electrolyte of claim 1, wherein:

the second die includes as an additional recessed part formed at a position corresponding to the recessed part of the first die.

10. The curing die for manufacturing a gel polymer electrolyte of claim 1, wherein:

the second die has a flat structure without the recessed part.

11. The curing die for manufacturing a gel polymer electrolyte of claim 1, wherein:

the one side end parts of the first die and the second die are interconnected by a hinge.

12. A method for manufacturing a gel polymer battery cell using the curing die of claim 1, comprising:

(i) preparing the processing battery cell including the electrode assembly and the composition for forming a gel polymer electrolyte inside the battery case;

(ii) mounting the processing battery cell in the recessed part of the first die and closing the processing battery cell;

(iii) controlling the curing die to thereby gel the composition for forming a gel polymer electrolyte in the battery case by a cross-linking reaction.

13. The method of claim 12, wherein:

in step (iii), the curing die is placed in an oven and a temperature in the oven is controlled, or a current is applied to a heating wire of the curing die, thereby heating the curing die to gel the composition for forming a gel polymer electrolyte.

14. The method of claim 12, wherein:

a temperature for the cross-linking reaction is 30 to 100 degrees Celsius.

15. The method of claim 12, further comprising:

(iv) connecting die terminals of the curing die to a charge and discharge device to perform an activation process of the processing battery cell.

16. The method of claim 12, wherein:

the unsealed part of the processing battery cell is extended from a side surface of a battery cell body where electrode terminals are not formed, and maintains a sealed state by the first die and the second die outside of the recessed part.

17. The method of claim 12, wherein:

the composition for forming a gel polymer electrolyte includes an electrolytic solution solvent, a lithium salt, a reactive monomer or oligomer, and an initiator.

* * * * *